(12) United States Patent
Eisiminger

(10) Patent No.: US 9,271,508 B2
(45) Date of Patent: Mar. 1, 2016

(54) SEPARATION CHAMBERS FOR DEBONING MACHINES

(71) Applicant: WEILER AND COMPANY, INC., Whitewater, WI (US)

(72) Inventor: Eric A. Eisiminger, Sandy, UT (US)

(73) Assignee: WEILER AND COMPANY, INC., Whitewater, WI (US)

( * ) Notice: Subject to any disclaimer, the term of this patent is extended or adjusted under 35 U.S.C. 154(b) by 0 days.

(21) Appl. No.: 14/737,631

(22) Filed: Jun. 12, 2015

(65) Prior Publication Data
US 2015/0272139 A1 Oct. 1, 2015

Related U.S. Application Data

(63) Continuation of application No. 13/850,443, filed on Mar. 26, 2013, now Pat. No. 9,107,426.

(60) Provisional application No. 61/615,474, filed on Mar. 26, 2012.

(51) Int. Cl.
*A22C 17/00* (2006.01)
*A22C 17/04* (2006.01)

(52) U.S. Cl.
CPC ............... *A22C 17/004* (2013.01); *A22C 17/04* (2013.01)

(58) Field of Classification Search
CPC ....... A22C 7/00; A22C 7/0069; A22C 17/004
USPC ............. 452/135, 138, 139; 241/74, 82.3, 24, 241/823, 247, 260.1
See application file for complete search history.

(56) References Cited

U.S. PATENT DOCUMENTS

| 1,611,777 | A | * | 12/1926 | Pincus | 241/82.3 |
|---|---|---|---|---|---|
| 3,184,171 | A | * | 5/1965 | Daman | 241/41 |
| 5,306,202 | A | * | 4/1994 | Meeker | 452/138 |
| 5,597,352 | A | | 1/1997 | Roth | |
| 5,667,435 | A | | 9/1997 | Baughman et al. | |
| 5,813,909 | A | * | 9/1998 | Goldston | 452/138 |
| 5,880,305 | A | * | 3/1999 | Kraus et al. | 556/459 |
| 6,622,950 | B1 | * | 9/2003 | Fleming et al. | 241/74 |
| 7,896,730 | B2 | | 3/2011 | Lesar | |
| 7,922,567 | B2 | * | 4/2011 | Gulak | 452/138 |
| 8,584,978 | B2 | * | 11/2013 | Lesar et al. | 241/74 |
| 8,951,101 | B2 | * | 2/2015 | Smith | 452/138 |
| 2005/0077212 | A1 | | 4/2005 | Prince et al. | |

OTHER PUBLICATIONS

International Search Report and Written Opinion of PCT/US13/33878, Date of Mailing Jun. 10, 2013, 8 pages.

* cited by examiner

*Primary Examiner* — Richard Price, Jr.
(74) *Attorney, Agent, or Firm* — Klintworth & Rozenblat IP LLC

(57) ABSTRACT

Separation chambers, deboning machines, and methods of operating the same are provided. In one aspect, a separation chamber for a compression-type deboning machine includes a body defining an internal cavity therein having a frusto-conical shape. A central longitudinal axis of the body extends from a first opening of the cavity near a first end of the body to a second opening of the cavity near a second end of the body. The first opening is larger than the second opening. The separation chamber also includes a plurality of perforations defined through the body from an inner surface of the body to an outer surface of the body. Each perforation includes a perforation axis extending longitudinally through a center of the perforation. The perforation axes of the plurality of perforations are transverse to a radial axis extending perpendicular to the central longitudinal axis of the body.

17 Claims, 8 Drawing Sheets

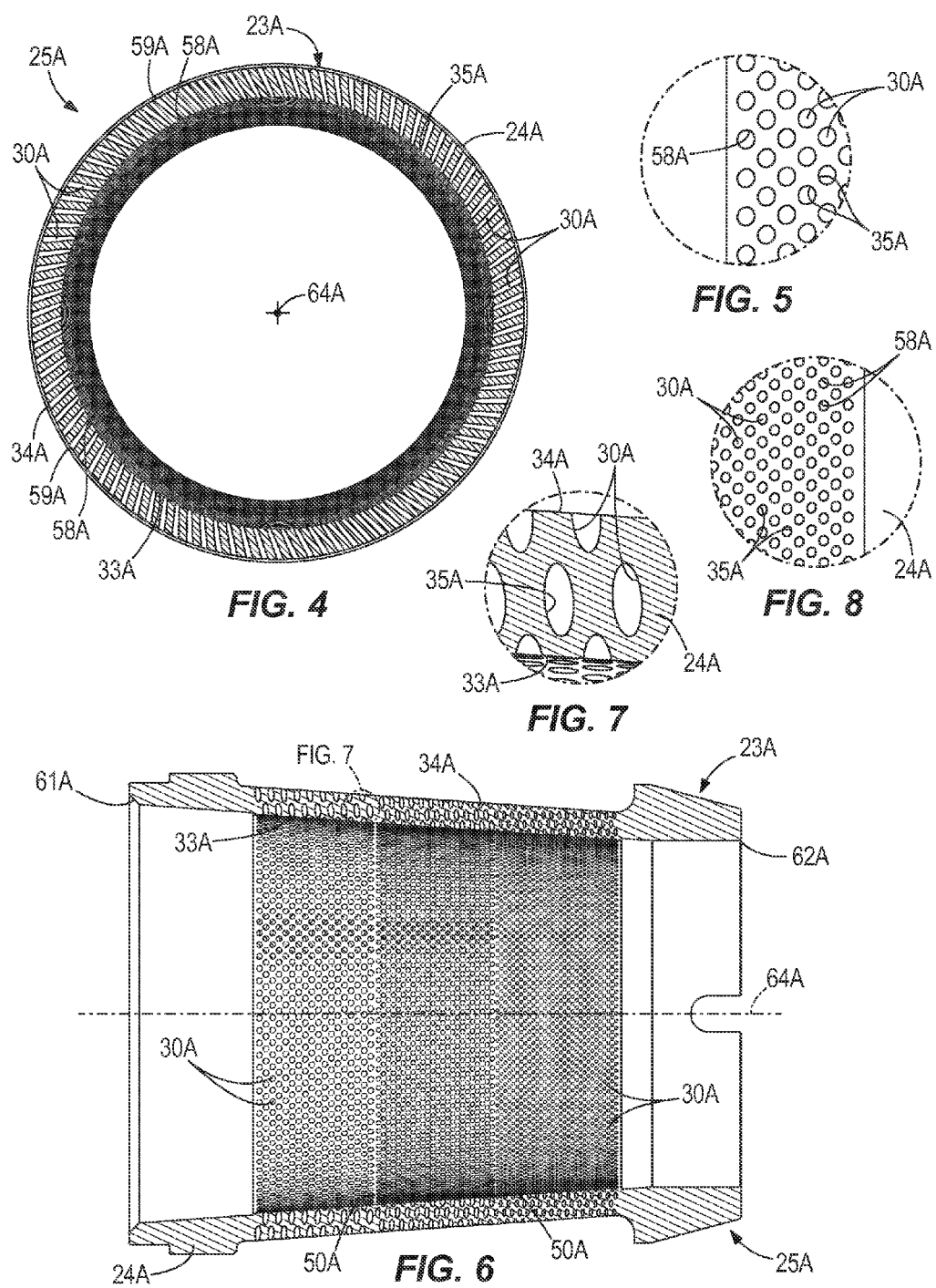

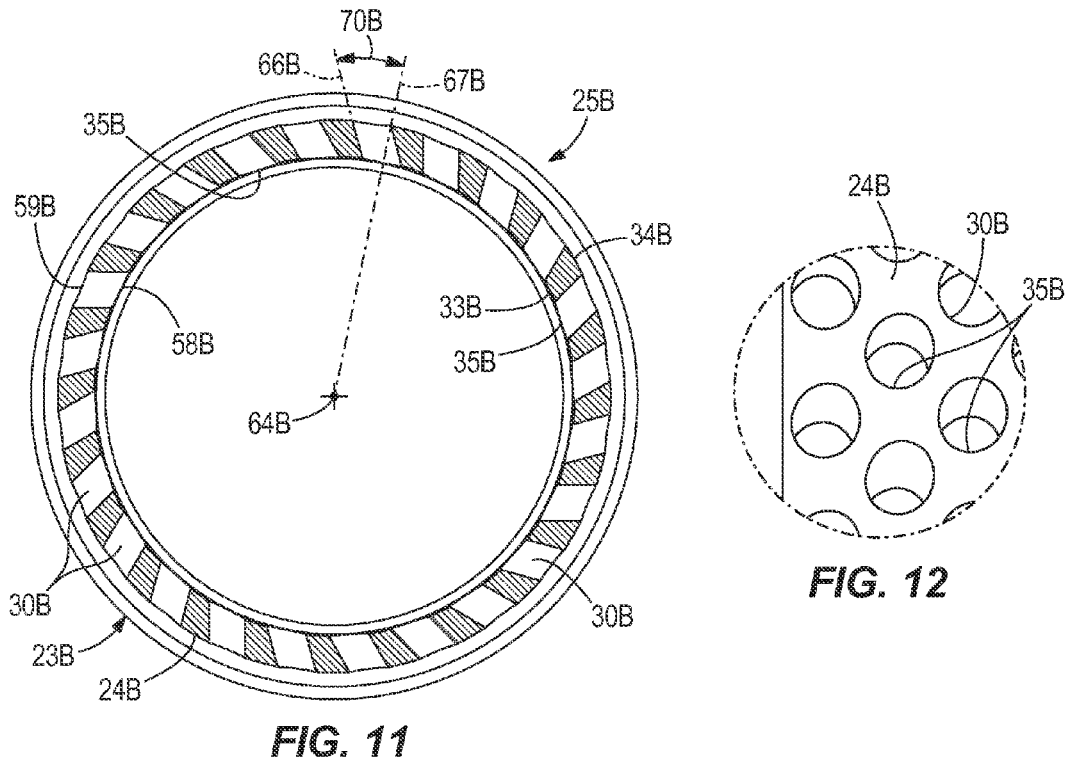
*FIG. 11*
*FIG. 12*
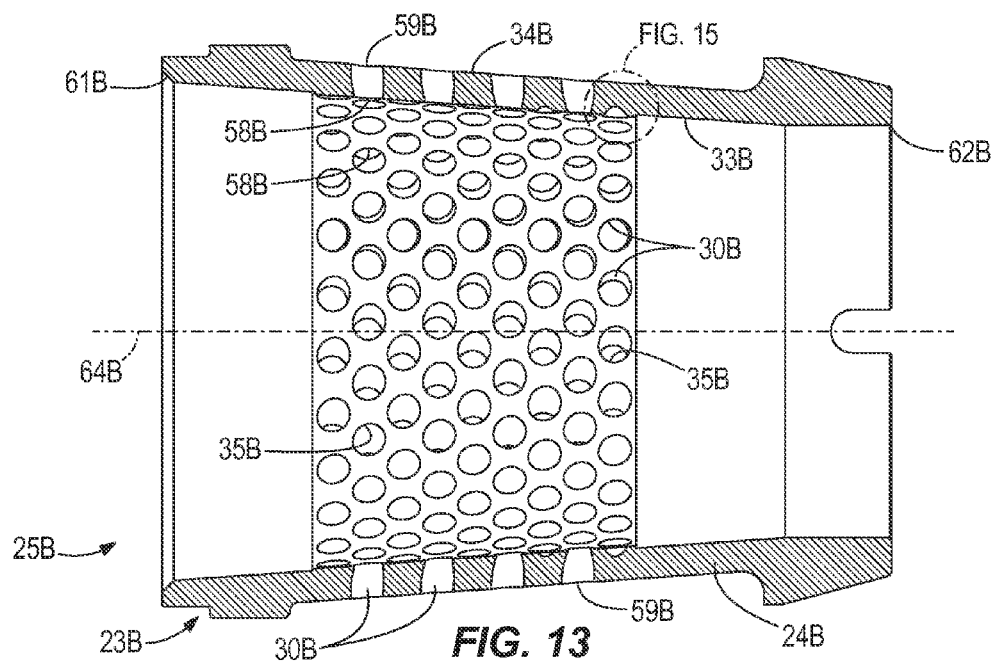
*FIG. 13*

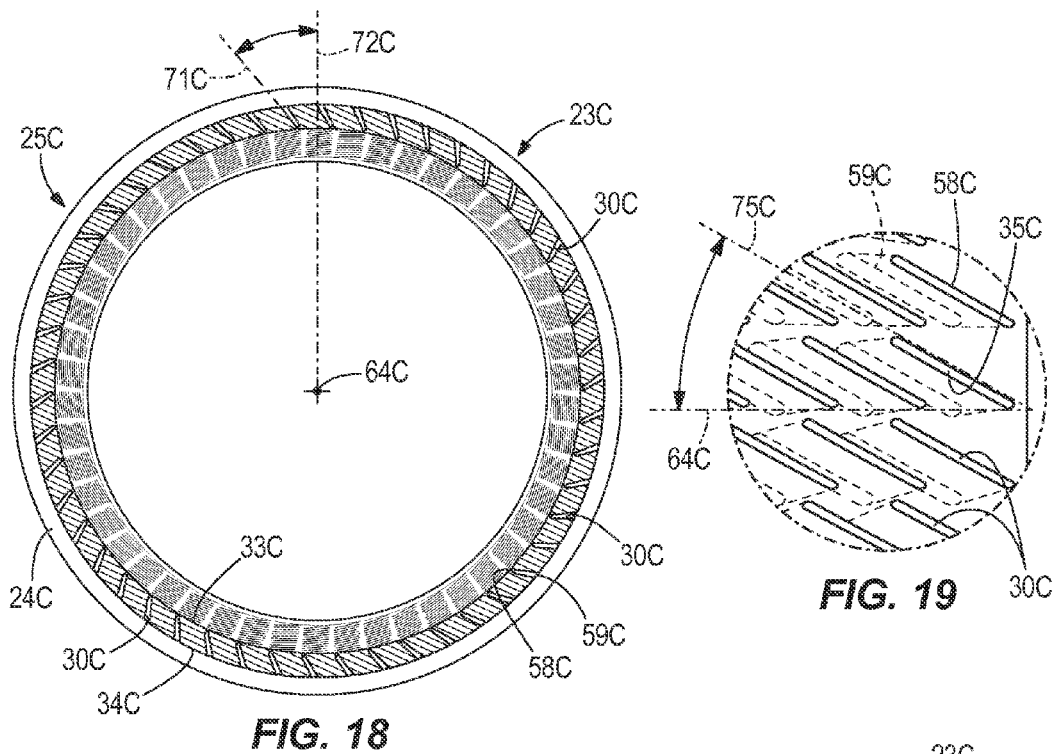
FIG. 18
FIG. 19
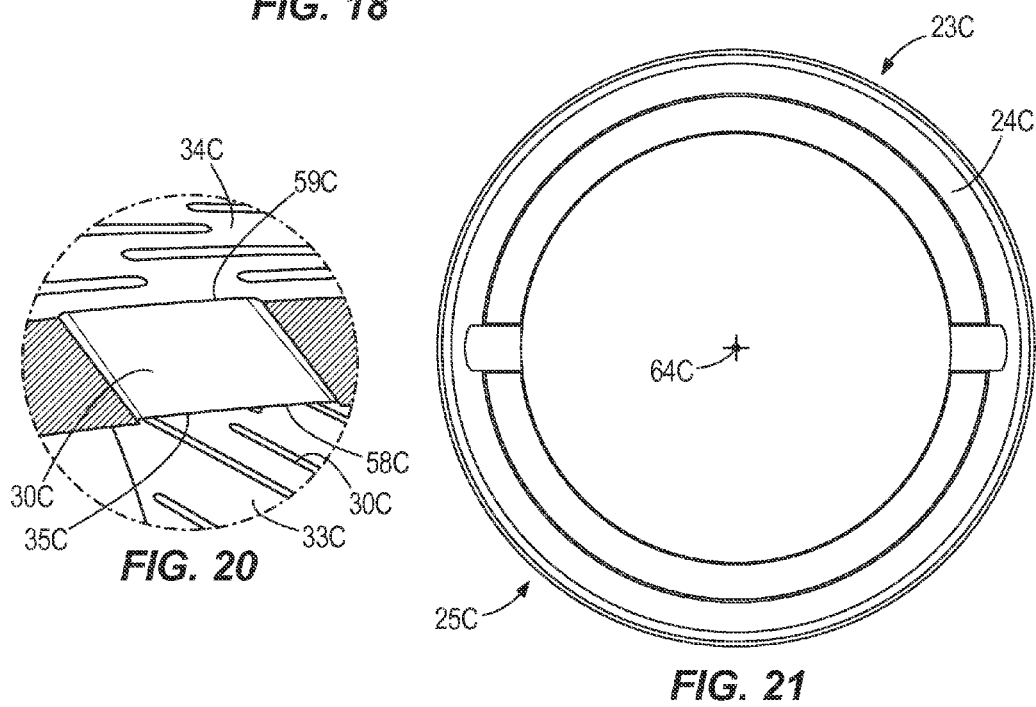
FIG. 20
FIG. 21

SEPARATION CHAMBERS FOR DEBONING MACHINES

RELATED APPLICATIONS

The present application is a continuation of U.S. patent application Ser. No. 13/850,443, filed Mar. 26, 2013, which claims the benefit of U.S. Provisional Patent Application No. 61/615,474, now U.S. Pat. No. 9,107,426 filed Mar. 26, 2012, all of which are incorporated by reference herein in their entirety.

FIELD OF THE INVENTION

The present disclosure generally relates to machines for deboning or separating meats, such as red meat, pork, poultry and fish, from bone, cartilage or sinew, and, more particularly, to perforated separation chambers included in such machines.

BACKGROUND

Conventional deboning machines are represented in U.S. Pat. Nos. 4,189,104 and 5,813,909. U.S. Pat. No. 4,189,104 generally relates to deboning machines of the type in which an auger conveys ground meat and bone materials through a perforated conduit from one end thereof while exerting pressure on said materials to force meat components out of the conduit through the perforations thereof at the same time that bone components are being conveyed to discharge at the other end of the conduit through an adjustable valve ring which surrounds an extension of the auger and is adapted to control pressure within the conduit. The valve ring includes an internal, circumferential series of indentations confronting the auger extension and extends axially so as to be open to discharge for positively expelling bone components. U.S. Pat. No. 5,813,909 generally relates to a slotted separation chamber for a compression type deboning machine. The separation chamber may include a plurality of elongated slots.

SUMMARY

The present disclosure is defined by the following claims, and nothing in this section should be taken as a limitation on those claims.

In one aspect, the disclosure relates to separation of meat such as, for example, red meat, pork, poultry, and fish, from bone, cartilage or sinew, and to separation chambers usable with deboning machines to perform such separation.

In another aspect, a separation chamber for a compression-type deboning machine is provided. The separation chamber includes a body defining an internal cavity therein having a frusto-conical shape. A central longitudinal axis of the body extends from a first opening of the cavity near a first end of the body to a second opening of the cavity near a second end of the body. The first opening is larger than the second opening. The separation chamber also includes a plurality of perforations defined through the body from an inner surface of the body to an outer surface of the body. Each perforation includes a perforation axis extending longitudinally through a center of the perforation. The perforation axes of the plurality of perforations are transverse to a radial axis extending perpendicular to the central longitudinal axis of the body.

In a further aspect, a separation chamber for a compression-type deboning machine is provided. The separation chamber includes a body defining an internal cavity therein having a frusto-conical shape. The internal cavity has a first opening near a first end of the body and a second opening near a second end of the body with the first opening being larger than the second opening. The separation chamber also includes a plurality of perforations defined through the body from an inner surface of the body to an outer surface of the body. Each perforation includes a material inlet defined at the inner surface of the body and a material outlet defined at the outer surface of the body. The material inlet and the material outlet associated with one of the plurality of perforations are angularly offset from one another with respect to a radial axis extending perpendicular to a central longitudinal axis of the body.

In still another aspect, a compression-type deboning machine is provided and includes an auger and a separation chamber. The auger is adapted to rotate and includes at least one flute. The auger is adapted to move meat connected to unwanted material from a feed end of the machine toward a discharge end of the machine upon rotation of the auger. The separation chamber defines a plurality of perforations from an inner surface of the separation chamber to an outer surface of the separation chamber. The inner surface of the separation chamber defines a frusto-conical cavity that is adapted to receive the auger therein. Each perforation defines a perforation axis extending longitudinally through a center of the perforation, and the perforation axes of the plurality of perforations are transverse to a radial axis extending perpendicular to a central longitudinal axis of the separation chamber. The flute of the auger is adapted to cooperate with the separation chamber to separate meat from unwanted material by moving meat and unwanted material through the separation chamber with the meat passing into and through the plurality of perforations transversely to the radial axis and the unwanted material moving through the separation chamber along the central longitudinal axis of the separation chamber toward the discharge end.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

FIG. 4 is a cross-sectional view taken along line 4-4 of the separation chamber shown in FIG. 2.

FIG. 5 is an enlarged detail of a portion of the separation chamber taken from FIG. 3.

FIG. 6 is a cross-sectional view taken along line 6-6 of the separation chamber shown in FIG. 2.

FIG. 7 is an enlarged detail of a portion of the separation chamber taken from FIG. 6.

FIG. 8 is an enlarged detail of a portion of the separation chamber taken from FIG. 3.

FIG. 11 is a cross-sectional view taken along line 11-11 of the separation chamber shown in FIG. 9.

FIG. 12 is an enlarged detail of a portion of the separation chamber taken from FIG. 10.

FIG. 13 is a cross-sectional view taken along line 13-13 of the separation chamber shown in FIG. 9.

FIG. 18 is a cross-sectional view taken along line 18-18 of the separation chamber shown in FIG. 16.

FIG. 19 is an enlarged detail of a portion of the separation chamber taken from FIG. 17.

FIG. 20 is a cross-sectional view taken along line 20-20 of an exemplary perforation of the separation chamber shown in FIG. 16.

FIG. 21 is an end view of the separation chamber shown in FIG. 16.

DETAILED DESCRIPTION

Figure 1:
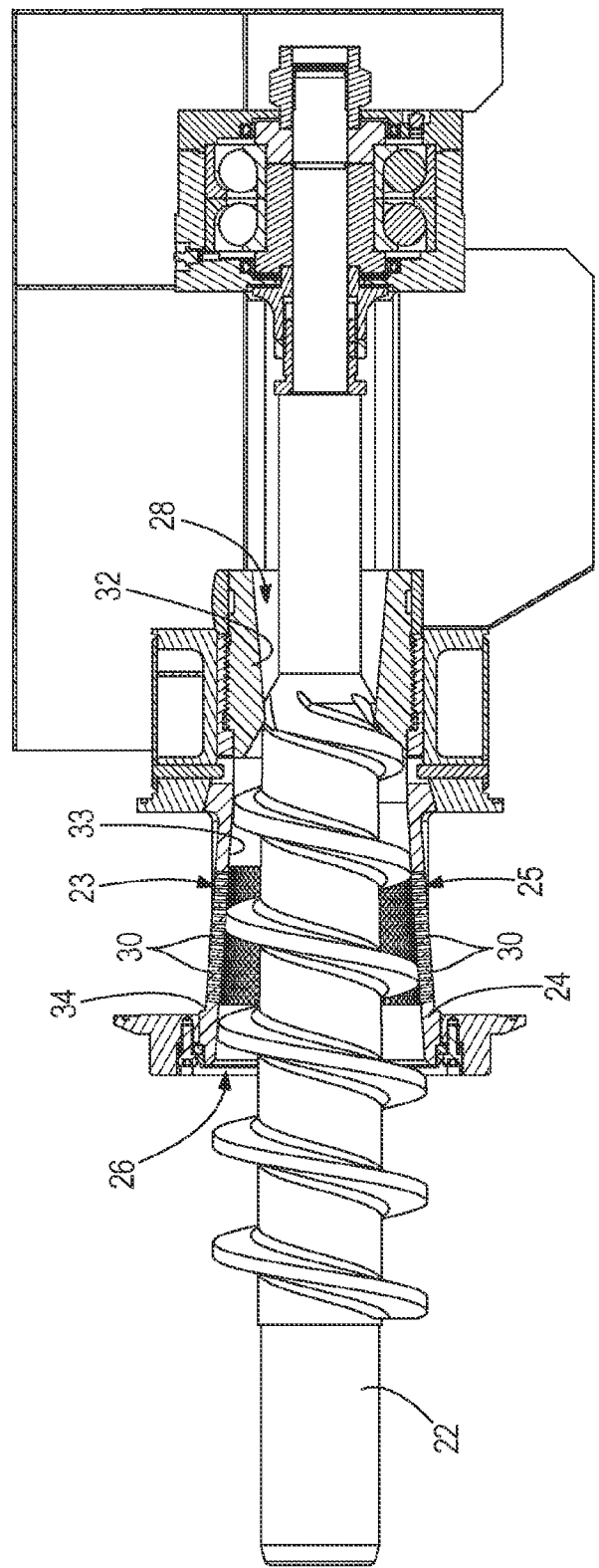
FIG. 1 is a cross-sectional view of an exemplary deboning machine taken along a plane extending along a central longitudinal axis of the deboning machine.
Figure 2:
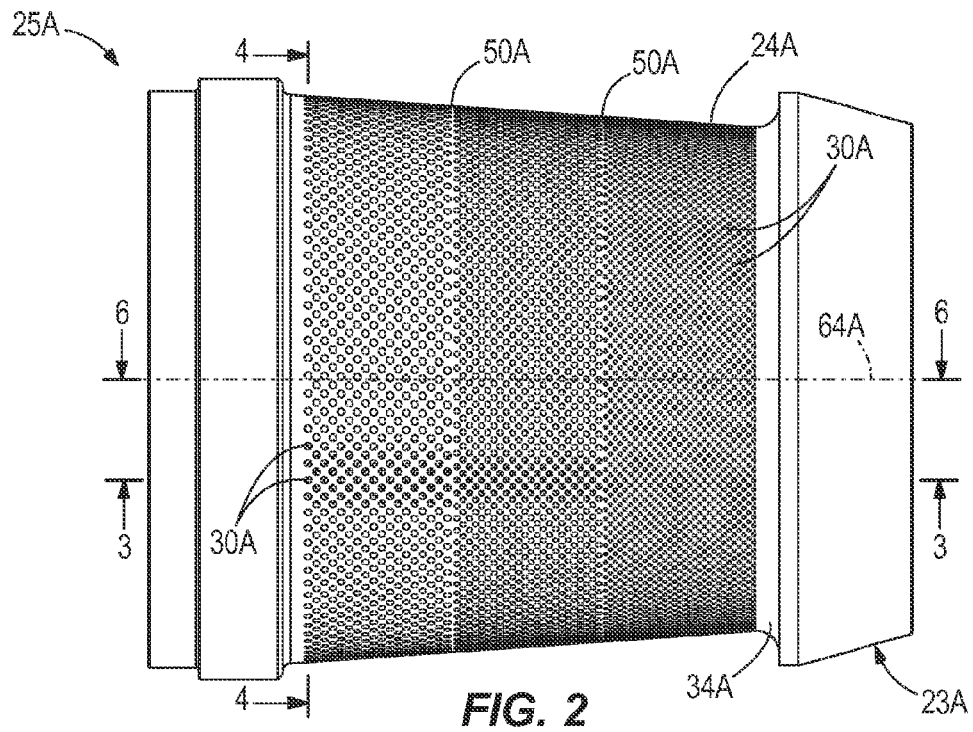
FIG. 2 is a side view of an exemplary separation chamber adapted to be used with the deboning machine illustrated in FIG. 1.
Figure 3:
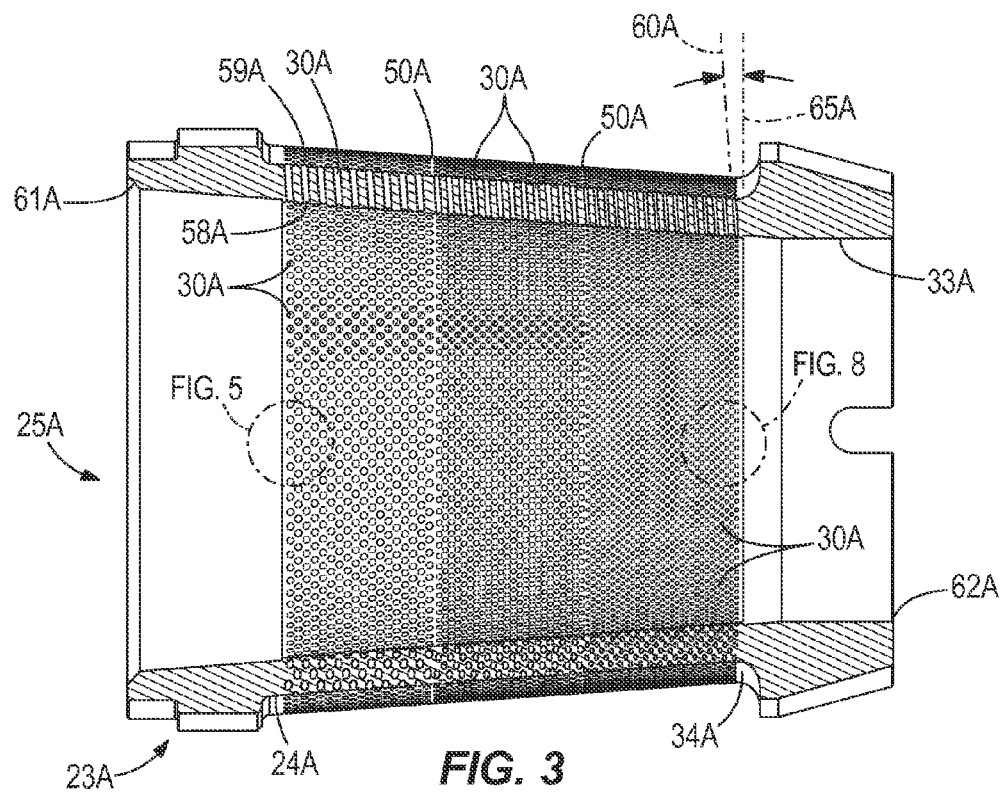
FIG. 3 is a cross-sectional view taken along line 3-3 of the separation chamber shown in FIG. 2.
Figure 9:
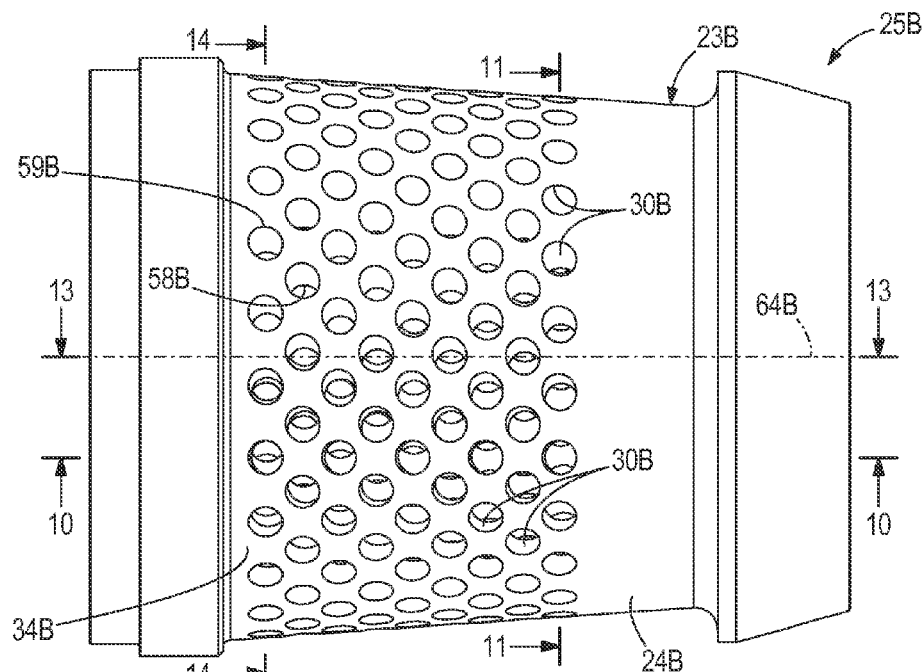
FIG. 9 is a side view of another exemplary separation chamber adapted to be used with the deboning machine illustrated in FIG. 1.
Figure 10:
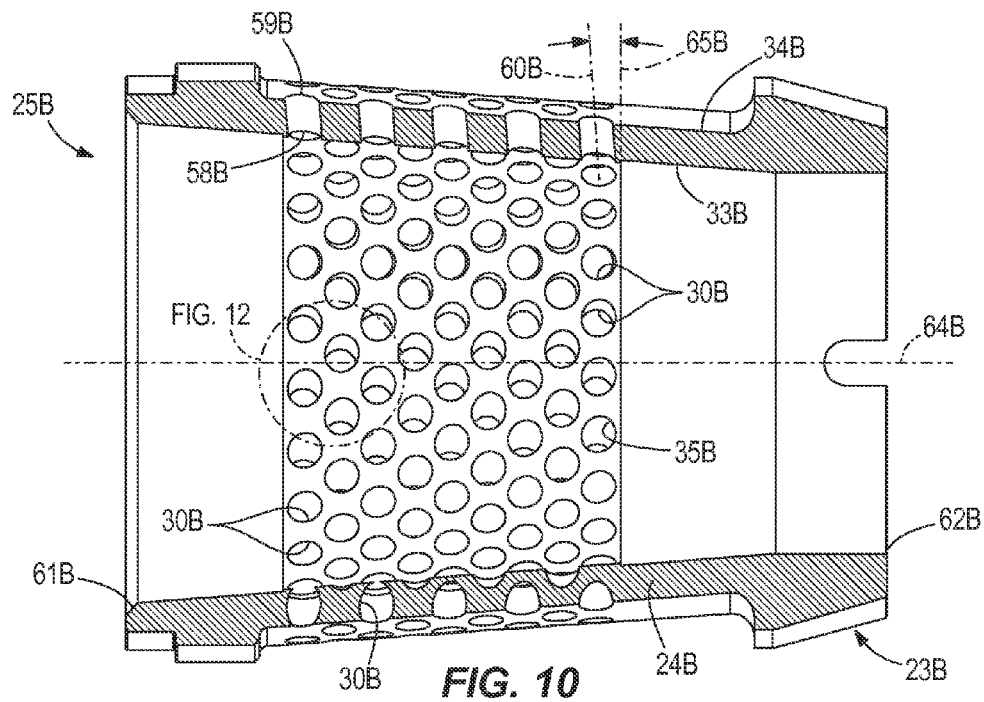
FIG. 10 is a cross-sectional view taken along line 10-10 of the separation chamber shown in FIG. 9.

With respect to FIG. 1, an exemplary deboning machine 20 is illustrated and includes a compression type conveyor screw or auger 22 that operates in a perforated conduit and in close proximity to a perforated frustoconical separation chamber 25. Bone connected meat is communicated from a feed end 26 of the machine 20 to a bone discharge end 28 of the machine 20. Separation chamber 25 includes a body 23 with a circumferential wall 24 defining an internal cavity adapted to receive the auger 22 therein and a plurality of apertures or perforations 30 defined in the wall 24. As rotation of the auger 22 moves meat and bone material past separation chamber 25 toward discharge end 28, meat separated from the bone material passes radially through the perforations 30 in the separation chamber 25 and the remaining bone material is dispelled from the machine 20 proximate the bone discharge end 28 of machine 20. In some exemplary embodiments, a valve ring 32 may surround a downstream portion of the auger 22 in a manner creating a back pressure to provide a choke for controlling pressure within the separation chamber 25, thereby controlling meat extrusion through the perforations 30 of the chamber 25.

The separation chamber 25 may be made of a variety of materials, such as, for example, machined heavy duty stainless steel, that are adapted to withstand high pressures associated with the deboning operation. The perforations 30 extend between an inner surface 33 and an outer surface 34 of the wall 24, and provide a plurality of sharp arcuate edges 35 which, in cooperation with the fluted turns of the auger 22, function to strip the meat from the bone or other unwanted material as the bone connected meat moves progressively by the turns of the auger 22 from the feed end 26 to the bone discharge end 28. In some instances, it is desirable to have a coarser and improved texture of meat recovered from bone, cartilage, or sinew for use as a primary meat source and to provide for separation of the meat from the underlying bone material to limit the amount of calcium associated with bone particles allowed to pass with the recovered meat from the separation chamber 25.

Referring now to FIGS. 2-8, an exemplary separation chamber 25A is illustrated. The separation chamber 25A illustrated in FIGS. 2-8 may have similarities to other separation chambers illustrated in the figures and described herein, and like components have the same reference number and an "A". The separation chamber 25A is adapted to operationally cooperate with a compression type screw conveyor or auger 22 of compression type deboning machines such as the machine 20 shown in FIG. 1.

Separation chamber 25A includes a plurality of mutually spaced-apart openings or perforations 30A having a generally circular shape. In the illustrated exemplary embodiment, the perforations 30A lie in adjacent annular rows that extend about the circumference of the wall 24A of the separation chamber 25A. The adjacent rows of perforations 30A may be oriented to either be aligned with one another or oriented so that a circumferential path or footprint associated with the perforations 30A of one row overlap a circumferential path or footprint associated with an adjacent circumferential row of perforations 30A (as illustrated in FIGS. 2-8). It is further appreciated that perforations 30A may be provided in a generally uniform pattern along the perforated portion of the separation chamber, or be provided with a non-uniform perforation pattern, such as separation chamber 25A, which includes a perforation pattern discontinuity 50A visible as a band in the perforation pattern.

Regardless of the specific orientation or patterning of the perforations 30A, the perforations 30A of the separation chamber 25A are not normal to inner and outer surfaces 33A, 34A of the chamber 25A proximate the perforation 30A and are preferably oriented at oblique angles relative to the direction of rotation of the auger 22 and the inner and outer surfaces 33A, 34A of the chamber 25A. Orienting perforations 30A in such a non-normal orientation may provide a finished product having lower calcium levels, which is indicative of less bone material being allowed to pass through the perforations 30A with the desired meat materials. The oblique orientation of the perforations 30A may reduce the "cheese grater" effect on bone being moved past respective perforations 30A during rotation of auger 22, thereby reducing the amount of bone that is capable of passing through perforations 30A.

With continued reference to FIGS. 2-8, the perforations 30A associated with chamber 25A extend from the inner surface 33A to the outer surface 34A of the chamber 25A. Each perforation 30A is defined as a passage that has a material inlet opening 58A and a material discharge opening 59A. A central longitudinal axis 60A of each perforation 30A (one exemplary axis 60A shown in FIG. 3) is oriented in a transverse direction with respect to an axis 65A perpendicular to a central longitudinal axis 64A of the chamber 25A. In other words, the axes 60A of all the perforations 30A are transverse or non-perpendicular to the central longitudinal axis 64A of the chamber 25A. The material inlet opening 58A and the corresponding material discharge opening 59A of each perforation 30A are angularly offset from one another with respect to a cross-section of the chamber 25A that is normal to the longitudinal axis 64A of the chamber 25A. Said in another way, openings 58A, 59A associated with a respective perforation 30A are not concentrically oriented relative to a common radian axis 65A that extends in a normal radial direction from the central longitudinal axis 64A of the chamber 25A. The frustoconical chamber 25A includes a larger opening 61A in a first end and a smaller opening 62A in a second end. The perforations 30A angle toward the larger opening 61A of the chamber 25A such that the material discharge opening 59A of each perforation 30A is closer to the larger opening 61A of the chamber 25A than its associated material inlet opening 58A.

In some exemplary embodiments, the perforations 30A along an entire longitudinal length of the chamber 25A may have a generally uniform oblique orientation. The increase in the oblique angle of the axes 60A, or the further the perforation 30A is from a normal orientation relative to the inner and outer surfaces 33A, 34A of chamber 25A, allows the interaction between the auger 22 and the chamber 25A, and the material passed there along, to reduce the incidence of cut bone material passed through the respective perforations 30A with the meat material. That is, rather than shearing the bone and pushing it into the meat product directed through the perforations 30A, movement of the auger 22 past the obliquely oriented perforations 30A pulls a greater percentage of such sheared bone fragments back into the chamber 25A such that the bone fragments can be dispelled with waste product rather than being discharged with the meat product. Accordingly, the chamber 25A may provide higher meat product yields with improved particle size and with lower bone or calcium content.

Referring now to FIGS. 9-15, another exemplary separation chamber 25B is illustrated. The separation chamber 25B illustrated in FIGS. 9-15 may have similarities to other separation chambers illustrated in the figures and described herein, and like components have the same reference number and a "B". The separation chamber 25B is adapted to operationally cooperate with a compression type screw conveyor or auger 22 of a compression type deboning machines such as the machine 20 illustrated in FIG. 1.

Figure 14:
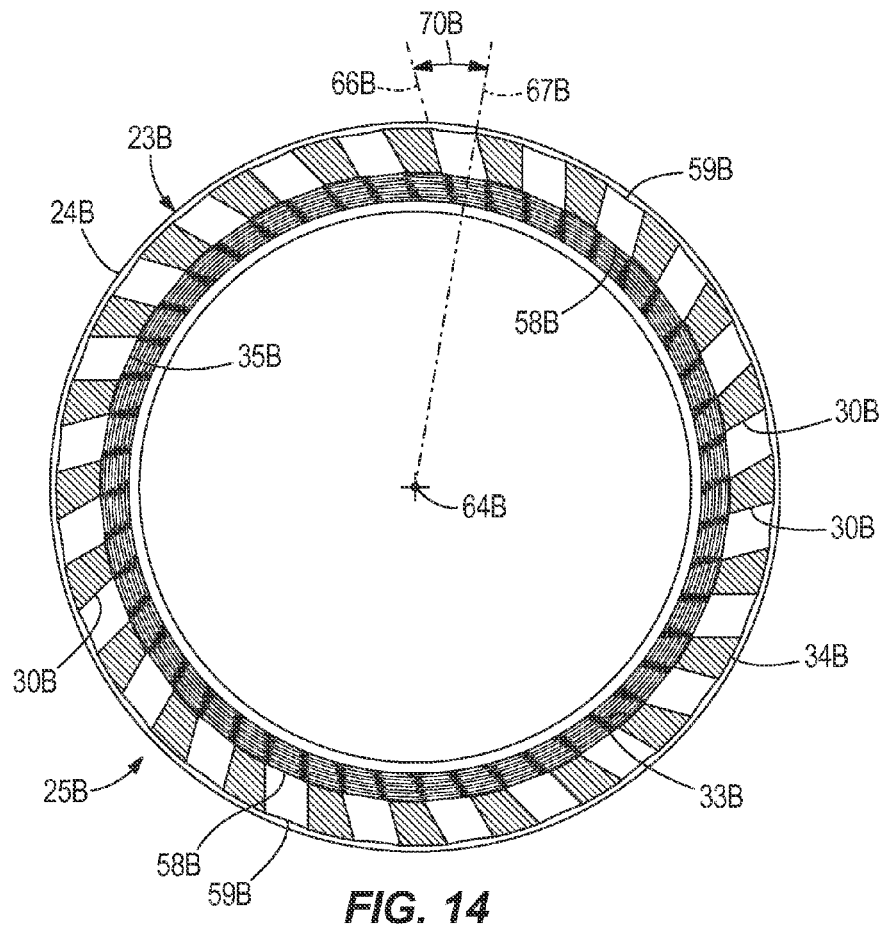
FIG. 14 is a cross-sectional view taken along line 14-14 of the separation chamber shown in FIG. 9.
Figure 15:
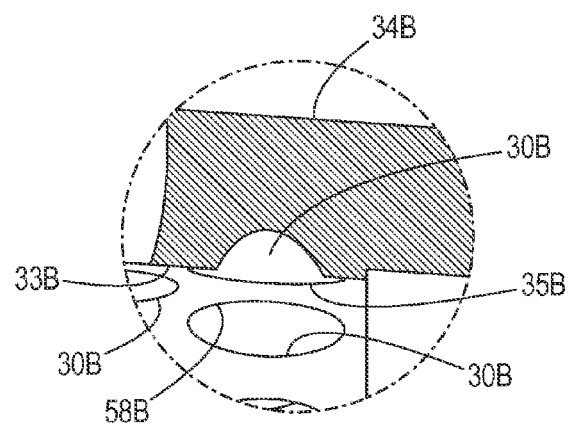
FIG. 15 is an enlarged detail of the separation chamber taken from FIG. 13.

The separation chamber 25B includes a plurality of apertures or perforations 30B defined through a wall 24B from an inner surface 33B to an outer surface 34B of the wall 24B. In the illustrated exemplary embodiment, the perforations 30B have a different configuration than the perforations 30, 30A illustrated in FIGS. 1-8. More particularly, the perforations 30B include oblique angles defined by axes 66B that may vary along the longitudinal length of the chamber 25B such that, for example, a circumferential row of perforations 30B associated with the larger opening 61B (or material intake end) of the chamber 25B may have perforation axes 66B at a different oblique angle relative to a radial axis 67B perpendicular to the central longitudinal axis 64B of the chamber 25B than the axes 66B of a circumferential row of perforations 30B at the smaller opening 62B (or bone discharge end) of the chamber 25B. For instance, with reference to FIGS. 11 and 14, which correlate to normal radial cross-sections of chamber 25B at sections 11-11 and 14-14 taken from FIG. 9, the perforations 30B nearer the bone discharge end 62B of chamber 25B are oriented at a greater oblique angle than those perforations 30B that are nearer the material intake end 61B of chamber 25B. In one exemplary embodiment, the oblique angle 70B of the respective perforations 30B near the smaller opening 62B of chamber 25B is about 26.8 degrees from the radial axis 67B (see FIG. 11) whereas, as shown in FIG. 14 near the intake end 61B of chamber 25B, the oblique angle 70B of the respective perforations 30B is about 24.6 degrees from the radial axis 67B. In other exemplary embodiments, the chamber 25B may start out with an oblique angle 70B of the perforations 30B at about 24° relative to the radial axis 67B located near the material intake end 61B, such angles will alter along the length of the chamber 25B, and end up at about 27° relative to the radial axis 67B near the bone discharge end 62B of the chamber 25B. It should be understood that the perforations 30B may have oblique angles that alter from one another at any degree, to any extent, begin and end at any degree, alter at any pattern or configuration between the beginning and end of the perforations 30B, and all of such possibilities are intended to be within the spirit and scope of the present disclosure.

In some aspects, manipulating the obliqueness of the respective perforations manipulates interaction of the respective perforations, the auger, and the material being processed that is passed there along.

Referring now to FIGS. 16-21, a further exemplary separation chamber 25C is illustrated. The separation chamber 25C illustrated in FIGS. 16-21 may have similarities to other separation chambers illustrated in the figures and described herein, and like components have the same reference number and a "C". The separation chamber 25C is adapted to operationally cooperate with a compression type screw conveyor or auger 22 of a compression type deboning machines such as the machine 20 illustrated in FIG. 1.

Figure 16:
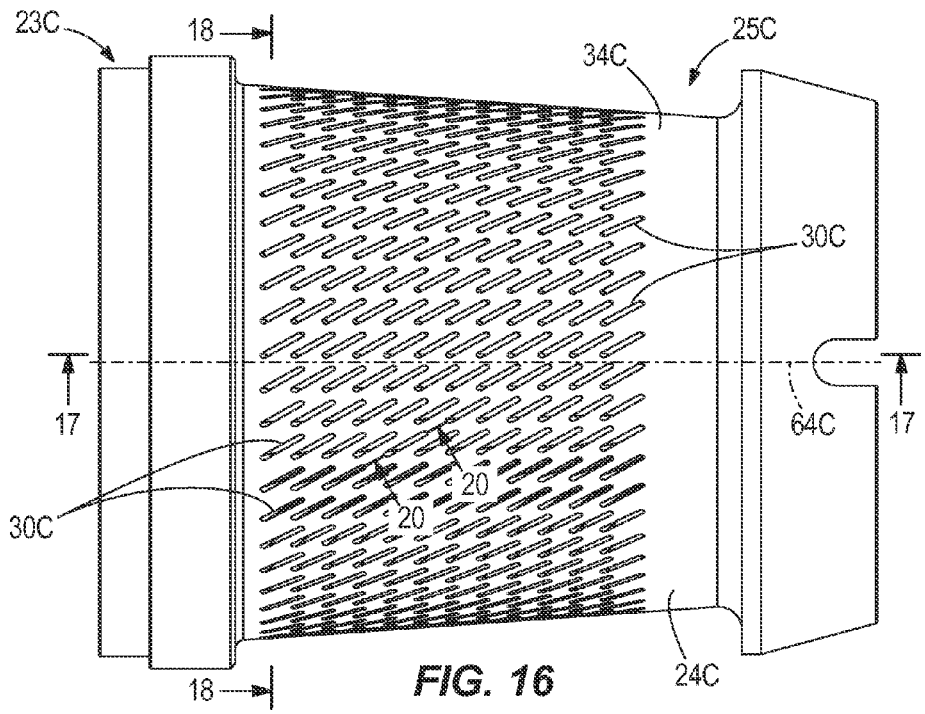
FIG. 16 is a side view of a further exemplary separation chamber adapted to be used with the deboning machine illustrated in FIG. 1.
Figure 17:
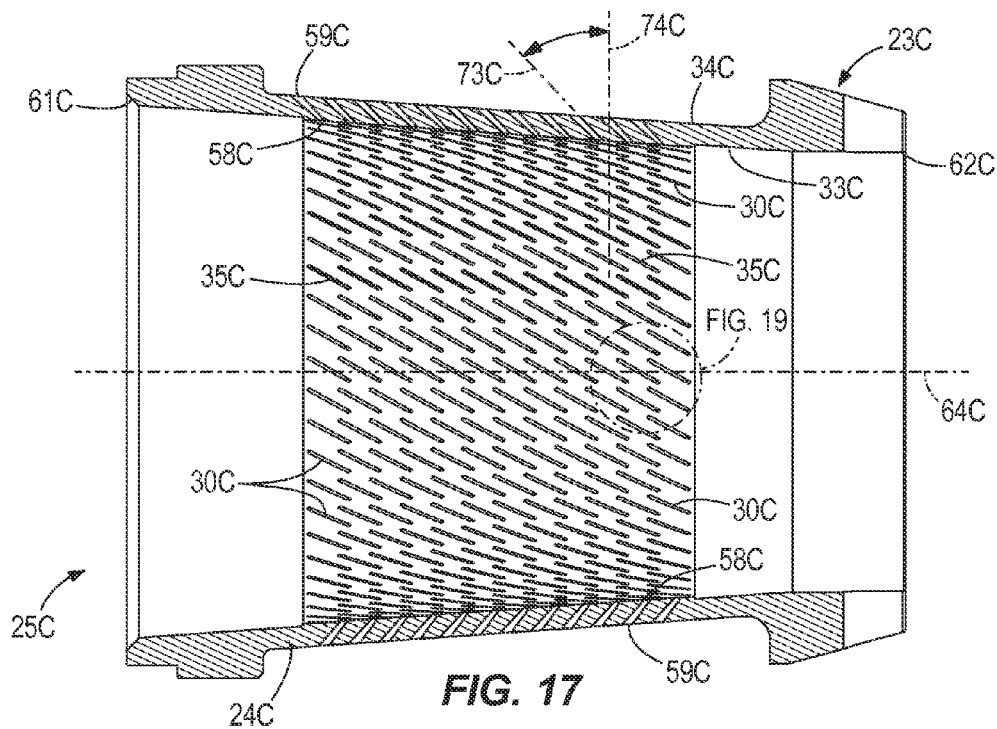
FIG. 17 is a cross-sectional view taken along line 17-17 of the separation chamber shown in FIG. 16.

The separation chamber 25C includes a plurality of apertures or perforations 30C defined through a wall 24C from an inner surface 33C to an outer surface 34C of the wall 24C. In the illustrated exemplary embodiment, the perforations 30C have a different configuration than the perforations 30, 30A, 30B illustrated in FIGS. 1-15. More particularly, the perforations 30C of separation chamber 25C are oblong or elongated in one direction more than in another direction to generally form slots 30C. As shown in FIG. 18, the perforations 30C include axes 71C and are still obliquely oriented with respect to radial axes 72C that extend perpendicular to the central longitudinal axis 64C of the chamber 25C. In other words, the perforations 30C are oriented in a counter rotational orientation as shown in FIG. 18. Also in the illustrated exemplary embodiment, the perforations 30C include material inlet openings 58C defined in the inner surface 33C of the wall 24C and material discharge openings 59C defined in the outer surface 34C of the wall 24C. In the illustrated exemplary embodiment, the material inlet opening 58C and material discharge opening 59C of each perforation 30C are not aligned with each other and do not lie in a common plane extending generally perpendicular to the central longitudinal axis 64C of the chamber 25C. Moreover, the material discharge opening 59C of each perforation 30C is located nearer the intake end 61C of chamber 25C than the material inlet opening 58C of the same perforation 30C. Each perforation 30C is canted or pitched in a direction toward the intake end 61C of the chamber 25C as it extends in an outward radial direction from the central longitudinal axis 64C. This concept of the perforations 30C can be demonstrated with reference to FIG. 17 whereby each perforation 30C includes an axis 73C that is obliquely orientated relative to a radial axis 74C extending perpendicular to the central longitudinal axis 64C of the chamber 25C. It is further appreciated that the elongated perforations 30C are not longitudinally aligned with the central longitudinal axis 64C of the chamber 25C, but instead extend transversely to the central longitudinal axis 64C. With reference to FIGS. 16 and 19, an exemplary longitudinal axis 75C of one of the perforations 30C is illustrated and extends transverse to the central longitudinal axis 64C.

In some exemplary embodiments, the perforations 30C as a whole may define a maximum perforation pattern area having a length of about 4.90 inches defined from a circumferential row of perforations 30C nearest the material intake end 61C to a circumferential row of perforations 30C nearest the bone discharge end 62C of the chamber 25C. In some exemplary embodiments, each perforation 30C may include a width ranging from about 0.02 to about 0.10 inches, and a length ranging from about 0.125 to about 1.75 inches. As shown in FIGS. 16-20, each elongated perforation 30C comprises a pair of spaced apart side walls, and opposing arcuate end walls. The side walls and end walls respectively define inner elongated side edges and arcuate end edges that are presented to the turns of the auger 22. Unlike conventional separation chamber configurations, the end walls of the perforations 30C are not perpendicular to the inner surface 33C of the separation chamber wall 24C, but instead are canted, pitched, or oriented at an angle relative thereto. Similarly to the separation chambers 25A, 25B, it should be understood that the shape, size, and orientation of perforations 30C may be alternatively configured to provide different zones along the longitudinal length of chamber 25C wherein the respective zones provide different choke and/or operating pressures to manipulate the yield of the separated meat as the product advances from the feed or intake end 61C of the chamber 25C toward the waste or bone discharge end 62C of the separation chamber 25C.

It should also be understood that separation chambers of the present disclosure may include perforations of a variety of different orientations, shapes, spacing, etc., to satisfy a wide variety of requirements, applications, raw or input material quality, desired finish product characteristics and quality, etc., and all of such possibilities are intended to be within the spirit and scope of the present disclosure.

Separation chambers 25-25C disclosed herein may be used with existing deboning machines or may be adapted to new design equipment. The perforations 30-30C, being concentric or elongated, can have a variety of shapes and sizes. For example, perforations 30-30C may range from about 0.02 inches to about 0.10 inches in width and about 0.125 inches to about 1.75 inches in length when provided as an elongated slot. Regardless of the shape, size, and configuration of the perforations 30-30C, the perforations 30-30C extend through the respective wall 24-24C of the respective chamber 25-25C in directions that are not normal to the inner and outer surfaces 33-33C, 34-34C of the chamber 25-25C. The degree with which the perforations 30-30C deviate from the various radial axes of the chambers may be any extent and, in some instances, the degree of deviation may increase, for example, as the perforations 30-30C are formed nearer the bone discharge end 62C of the chamber 25-25C.

It should further be understood that the perforations 30-30C may extend through the wall of the chambers 25-25C at any angle relative to the various radial axes 60A, 67B, 72C, 74C and may have any shape, size, spacing, etc. Moreover, the perforations 30-30C may be manufactured in any number of manners such as, for example, laser cut, step drilled, etc. It should still further be understood that the shape, size, and spacing of perforations 30A-30C may be manipulated in a number of manners to provide a desired finish product, such as, for example, 3 mm ground meat, to provide a desired finish product according to the type of meat to be separated and/or the skeletal part(s) to be processed, etc.

The Abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While various embodiments of the disclosure have been described, it will be apparent to those of ordinary skill in the art that other embodiments and implementations are possible within the scope of the disclosure. Accordingly, the disclosure is not to be restricted except in light of the attached claims and their equivalents.

The invention claimed is:

1. A separation chamber for a compression-type deboning machine, the separation chamber comprising:
   a body defining an internal cavity therein having a frusto-conical shape, wherein a central longitudinal axis of the body extends from a first opening of the cavity near a first end of the body to a second opening of the cavity near a second end of the body, wherein the first opening is larger than the second opening; and
   a plurality of perforations defined through the body from an inner surface of the body to an outer surface of the body, wherein each perforation includes a perforation axis extending longitudinally through a center of the perforation;
   wherein the perforation axes of the plurality of perforations are transverse to a radial axis extending perpendicular to the central longitudinal axis of the body.

2. The separation chamber of claim 1, wherein the plurality of perforations are formed in circumferential rows around a portion of a longitudinal length of the body.

3. The separation chamber of claim 2, wherein adjacent circumferential rows of perforations overlap each other.

4. The separation chamber of claim 1, wherein a cross-section taken through one of the perforations along a plane perpendicular to the perforation axis is generally circular in shape.

5. The separation chamber of claim 1, wherein a cross-section taken through one of the perforations along a plane perpendicular to the perforation axis is elongated in shape.

6. A separation chamber for a compression-type deboning machine, the separation chamber comprising:
   a body defining an internal cavity therein having a frusto-conical shape, wherein the internal cavity has a first opening near a first end of the body and a second opening near a second end of the body with the first opening being larger than the second opening; and
   a plurality of perforations defined through the body from an inner surface of the body to an outer surface of the body, wherein each perforation includes a material inlet defined at the inner surface of the body and a material outlet defined at the outer surface of the body;
   wherein the material inlet and the material outlet associated with one of the plurality of perforations are angularly offset from one another with respect to a radial axis extending perpendicular to a central longitudinal axis of the body.

7. The separation chamber of claim 6, wherein all pairs of material inlets and material outlets are angularly offset from one another with respect to the radial axis extending perpendicular to the central longitudinal axis of the body.

8. The separation chamber of claim 6, wherein the plurality of perforations are formed in circumferential rows around a portion of a longitudinal length of the body, and wherein adjacent circumferential rows of perforations overlap each other.

9. The separation chamber of claim 6, wherein the material inlet and material outlet are generally circular in shape.

10. The separation chamber of claim 6, wherein the material inlet and the material outlet are elongated in shape.

11. The separation chamber of claim 6, wherein the material outlet is closer to the first end of the body than the material inlet.

12. The separation chamber of claim 6, wherein the material inlet is closer to the first end of the body than the material outlet.

13. A compression-type deboning machine comprising:
an auger adapted to rotate and including at least one flute, wherein the auger is adapted to move meat connected to unwanted material from a feed end of the machine toward a discharge end of the machine upon rotation of the auger; and
a separation chamber defining a plurality of perforations from an inner surface of the separation chamber to an outer surface of the separation chamber, wherein the inner surface of the separation chamber defines a frusto-conical cavity that is adapted to receive the auger therein, wherein each perforation defines a perforation axis extending longitudinally through a center of the perforation, and wherein the perforation axes of the plurality of perforations are transverse to a radial axis extending perpendicular to a central longitudinal axis of the separation chamber;
wherein the flute of the auger is adapted to cooperate with the separation chamber to separate meat from unwanted material by moving meat and unwanted material through the separation chamber with the meat passing into and through the plurality of perforations transversely to the radial axis and the unwanted material moving through the separation chamber along the central longitudinal axis of the separation chamber toward the discharge end.

14. The compression-type deboning machine of claim 13, wherein the plurality of perforations are formed in circumferential rows around a portion of a longitudinal length of the body.

15. The compression-type deboning machine of claim 14, wherein adjacent circumferential rows of perforations overlap each other.

16. The compression-type deboning machine of claim 13, wherein a cross-section taken through one of the perforations along a plane perpendicular to the perforation axis is generally circular in shape.

17. The compression-type deboning machine of claim 13, wherein a cross-section taken through one of the perforations along a plane perpendicular to the perforation axis is elongated in shape.

\* \* \* \* \*